United States Patent
Sujan et al.

(10) Patent No.: US 8,452,509 B2
(45) Date of Patent: May 28, 2013

(54) SYSTEM AND METHOD OF VEHICLE SPEED-BASED OPERATIONAL COST OPTIMIZATION

(75) Inventors: Vivek A. Sujan, Columbus, IN (US); Phani Vajapeyazulla, Columbus, IN (US); Kenneth Follen, Greenwood, IN (US); An Wu, Columbus, IN (US); Barty L. Moffett, Seymour, IN (US); Howard R. Frost, Columbus, IN (US)

(73) Assignee: Cummins Intellectual Property, Inc., Minneapolis, MN (US)

( * ) Notice: Subject to any disclaimer, the term of this patent is extended or adjusted under 35 U.S.C. 154(b) by 0 days.

(21) Appl. No.: 13/336,950

(22) Filed: Dec. 23, 2011

(65) Prior Publication Data

US 2012/0197504 A1    Aug. 2, 2012

Related U.S. Application Data

(60) Provisional application No. 61/426,997, filed on Dec. 23, 2010.

(51) Int. Cl.
*G06F 19/00*    (2011.01)
(52) U.S. Cl.
USPC ............... 701/70; 701/54; 701/96; 701/103; 701/123; 701/533; 440/1; 475/5; 180/165; 73/781
(58) Field of Classification Search
USPC ..... 701/54, 70, 96, 103, 123, 533; 705/14.43, 705/14.45; 440/1; 475/5; 903/915, 940; 73/781; 180/165; 706/21; 700/99
See application file for complete search history.

(56) References Cited

U.S. PATENT DOCUMENTS

| | | | |
|---|---|---|---|
| 4,368,509 A | 1/1983 | Li | |
| 4,459,671 A * | 7/1984 | Teass et al. | 701/123 |
| 5,231,897 A | 8/1993 | Morita | |
| 5,394,331 A | 2/1995 | Dudek et al. | |
| 5,598,335 A | 1/1997 | You | |
| 5,839,533 A * | 11/1998 | Mikami et al. | 180/165 |
| 5,954,781 A * | 9/1999 | Slepian et al. | 701/96 |
| 6,038,505 A | 3/2000 | Probst et al. | |
| 6,154,658 A | 11/2000 | Caci | |
| 6,356,831 B1 | 3/2002 | Michelini et al. | |
| 6,374,173 B1 | 4/2002 | Ehlbeck | |
| 6,990,401 B2 * | 1/2006 | Neiss et al. | 701/96 |
| 7,742,867 B2 | 6/2010 | Liu et al. | |
| 7,849,031 B2 * | 12/2010 | Stehle et al. | 706/21 |
| 2003/0160455 A1 | 8/2003 | Hu et al. | |

(Continued)

OTHER PUBLICATIONS

The International Search Report and the Written Opinion of the International Search Authority dated Apr. 13, 2012; International Application No. PCT/US2011/067267.

*Primary Examiner* — Tuan C. To
*Assistant Examiner* — Yuri Kan
(74) *Attorney, Agent, or Firm* — Studebaker & Brackett PC; Tim L. Brackett, Jr.

(57) ABSTRACT

A vehicle speed-based operational cost optimization module provides an optimized velocity profile over a given route while also considering imposed constraints such as deviation from time targets, deviation from maximum governed speed limits, etc. Given current vehicle speed, engine state and transmission state, the present disclosure optimally manages the engine map to provide a recommended vehicle speed that optimizes fuel consumption. Exemplary embodiments provide for offline and online optimizations relative to fuel consumption. The benefit is increased freight efficiency in transporting cargo from source to destination by minimizing fuel consumption and maintaining drivability.

28 Claims, 4 Drawing Sheets

U.S. PATENT DOCUMENTS

| | | |
|---|---|---|
| 2004/0224577 A1* | 11/2004 | Kaji ................................ 440/1 |
| 2004/0239488 A1 | 12/2004 | Douglass, Jr. et al. |
| 2005/0090940 A1 | 4/2005 | Pajakowski et al. |
| 2005/0274553 A1 | 12/2005 | Salman et al. |
| 2006/0119507 A1 | 6/2006 | Cawse |
| 2006/0185626 A1 | 8/2006 | Allen et al. |
| 2007/0106442 A1 | 5/2007 | Lu |
| 2007/0112475 A1 | 5/2007 | Koebler et al. |
| 2007/0186669 A1* | 8/2007 | Cunningham ................ 73/781 |
| 2008/0027639 A1 | 1/2008 | Tryon |
| 2008/0059036 A1 | 3/2008 | Imai et al. |
| 2008/0125265 A1* | 5/2008 | Conlon et al. ................... 475/5 |
| 2008/0208393 A1 | 8/2008 | Schricker |
| 2008/0249667 A1 | 10/2008 | Horvitz |
| 2008/0254937 A1 | 10/2008 | Makiyama |
| 2008/0262712 A1 | 10/2008 | Duty et al. |
| 2009/0005974 A1* | 1/2009 | Lenneman et al. ........... 701/209 |
| 2009/0082957 A1 | 3/2009 | Agassi et al. |
| 2009/0118918 A1* | 5/2009 | Heap et al. ...................... 701/54 |
| 2009/0204245 A1* | 8/2009 | Sustaeta et al. ................. 700/99 |
| 2009/0276267 A1 | 11/2009 | Padan |
| 2010/0010732 A1 | 1/2010 | Hartman |
| 2010/0023190 A1 | 1/2010 | Kumar et al. |
| 2010/0228404 A1 | 9/2010 | Link, II et al. |
| 2010/0287073 A1 | 11/2010 | Kocis et al. |
| 2010/0318273 A1 | 12/2010 | Aleksic et al. |
| 2011/0257869 A1* | 10/2011 | Kumar et al. ................. 701/103 |
| 2012/0197504 A1* | 8/2012 | Sujan et al. .................... 701/70 |

* cited by examiner

SYSTEM AND METHOD OF VEHICLE SPEED-BASED OPERATIONAL COST OPTIMIZATION

CROSS-REFERENCE TO RELATED APPLICATION

This application claims the benefit of U.S. Provisional Application No. 61/426,997, filed Dec. 23, 2010, which is hereby incorporated by reference in its entirety.

TECHNICAL FIELD

This disclosure relates to the economization of fuel consumption during vehicle operation. More particularly, this disclosure relates to balancing vehicle speed targets to optimize fuel consumption.

BACKGROUND

As a vehicle traverses a given route, fuel economy can be significantly influenced by the way an operator selects vehicle speed. An aggressive operator that creates rapid transitions in speed while maintaining the maximum allowable speed limit through the route (legal, fleet owner imposed, etc.), will likely not achieve the maximum fuel economy potential of the route. Generally, vehicle operators rely upon speedometers and tachometers to inform themselves of their vehicle's current operating condition, with fuel purchase patterns providing some measure of economy. Speed regulating systems are occasionally employed that compare actual vehicle speed to pre-set values and such systems can be somewhat effective in monitoring and controlling vehicle performance over a given course. These speed regulating systems generally allow a vehicle operator to select a set-speed, and the system monitors actual vehicle speed in relation to the set-speed, controlling engine performance in order to maintain actual vehicle speed at the set-speed. Speed regulation is effectuated by regulating fuel flow to the vehicle's engine by detecting deviation from the set-speed and adjusting the fuel flow to reduce or eliminate the deviation. If the speed regulating system detects an under-speed condition, such as might occur while the vehicle traverses up a hill, the system commands an increase in fuel flow to increase vehicle speed. Alternatively, if the system detects an over-speed condition, such as might occur while the vehicle traverses down a hill, the system commands a decrease in fuel flow to decrease vehicle speed.

SUMMARY

According to some embodiments of the present disclosure, a method is provided for vehicle speed-based operational cost optimization for a vehicle. The method includes accessing predetermined vehicle parameter data indicative of at least one predetermined vehicle parameter, the at least one predetermined vehicle parameter including at least one of vehicle mass, vehicle drag, vehicle rolling resistance, tire circumference, front area of vehicle, and engine friction. The method further includes accessing road terrain data indicative of at least one road terrain element, the at least one road terrain element including at least one of speed limit changes, off ramp locations, fueling locations, road grade, air density and traffic congestion. The method also operator input data indicative of at least one operator input, said at least one operator input including at least one of fuel cost, operator income, trip time, route beginning and ending points to define a route, and maximum vehicle speed. The method further includes performing a first optimization wherein a vehicle speed optimization vector is determined based on said accessed predetermined vehicle parameter data, road terrain data, and said operator input data. The method additionally includes accessing current vehicle operating data indicative of at least two current vehicle operating conditions, said at least two current vehicle operating conditions including current vehicle speed and road grade. And the method includes performing a second optimization to determine an optimized vehicle speed based on said current vehicle operating data and said vehicle speed optimization vector to optimize cost.

According to other embodiments of the present disclosure, a system is provided for vehicle speed-based operational cost optimization for a vehicle. The system includes a vehicle parameter module containing data indicative of at least one predetermined vehicle parameter, the at least one predetermined vehicle parameter including at least one of vehicle mass, vehicle drag, vehicle rolling resistance, resistive force at lower gear, tire circumference, front area of vehicle, and engine friction. The system further includes a road terrain element module containing data indicative of at least one road terrain element, the at least one road terrain element including at least one of speed limit changes, off ramp locations, fueling locations, road grade, air density and traffic congestion. The system also includes an operator input module containing data indicative of at least one operator input, said at least one operator input including at least one of fuel cost, operator income, trip time, route beginning and ending points to define a route, and maximum vehicle speed. The system additionally includes a vehicle operating condition module containing data indicative of at least two current vehicle operating conditions, said at least two current vehicle operating conditions including current vehicle speed and road grade. And the system includes a vehicle speed-based operational cost optimization module adapted to perform a first optimization wherein a vehicle speed optimization vector is determined based on said accessed predetermined vehicle parameter data, road terrain data, and said operator input data, and perform a second optimization to determine an optimized vehicle speed based on said current vehicle operating data and said vehicle speed optimization vector to optimize cost.

Additional embodiments of the present disclosure provide a system and method for vehicle speed-based operational cost optimization to be implemented in computer programmable software and stored in computer readable media.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The above and/or other exemplary features and advantages of the preferred embodiments of the present disclosure will become more apparent through the detailed description of exemplary embodiments thereof with reference to the accompanying drawings, in which.

Throughout the drawings, like reference numbers and labels should be understood to refer to like elements, features, and structures.

DETAILED DESCRIPTION

Exemplary embodiments of the present disclosure will now be described more fully with reference to the accompanying drawings. The matters exemplified in this description are provided to assist in a comprehensive understanding of various embodiments disclosed with reference to the accompanying figures. Accordingly, those of ordinary skill in the art will recognize that various changes and modifications of the embodiments described herein can be made without departing from the scope and spirit of the claimed inventions. Descriptions of well-known functions and constructions are omitted for clarity and conciseness. To aid in clarity of description, the terms "upper," "lower," "above," "below," "left" and "right," as used herein, provide reference with respect to orientation of the accompanying drawings and are not intended to be limiting.

Figure 1:
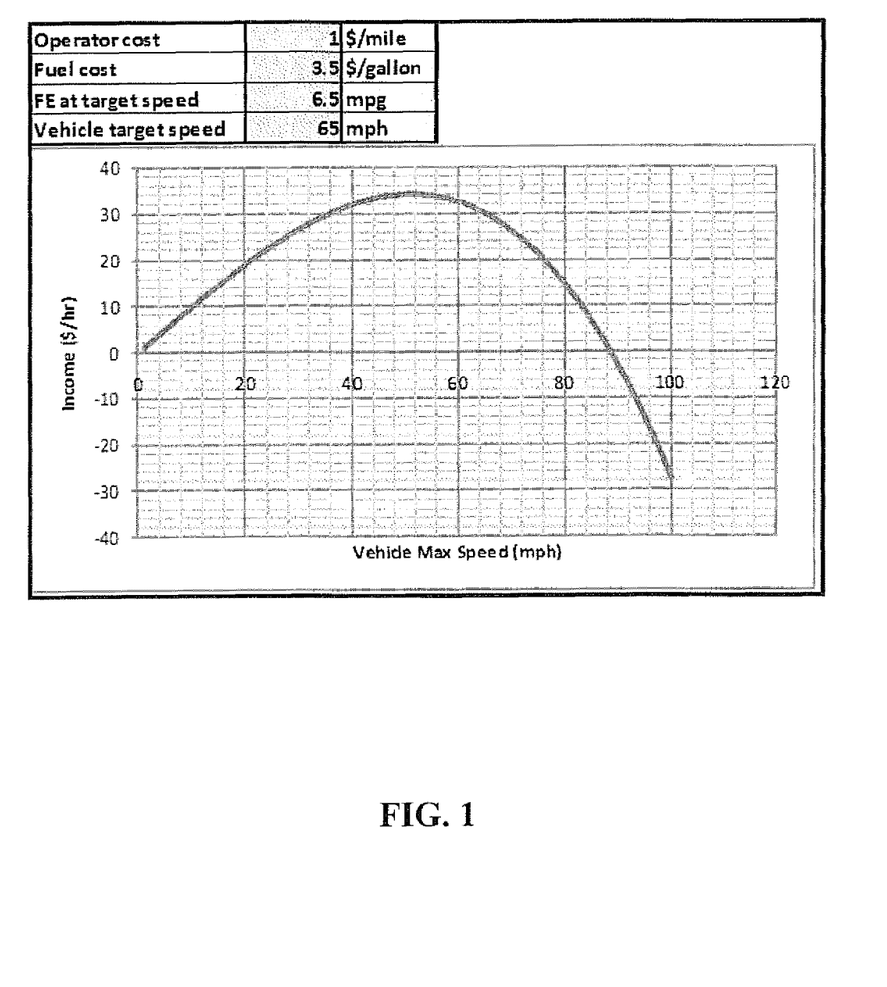
FIG. 1 is a graph plotting operating income as a function of vehicle speed in accordance with an exemplary embodiment of the present disclosure.

The speed that a vehicle travels has a direct influence on the vehicle's fuel economy. The faster that a vehicle travels, the more power it demands to overcome various forms of resistance, the greater the amount of fuel consumed. Forms of resistance include, but are not limited to, tire rolling resistance, aerodynamic drag, gravitational forces, acceleration and deceleration, etc. For a given vehicle and powertrain, there is a speed that achieves optimum/maximum fuel economy, above and below which there is a loss of powertrain efficiency. And because of various known and hidden costs and efficiencies throughout the vehicle and powertrain, the speed at which optimum fuel economy is obtained may not be the maximum allowable speed. This effect is depicted in FIG. 1, which is a graph plotting operating income as a function of vehicle speed in accordance with an exemplary embodiment of the present disclosure. The data used to provide this graph is exemplary and not limiting to the present disclosure. From the graph it can be seen that there is a specific speed at which operating income (in $ per hour) is maximum, shown as approximately 52 miles per hour. As vehicle speed deviates above or below this optimal speed, income drops. Thus, it is helpful for an operator to know the optimal speed on a real-time basis so that income can be maximized during the entire course of travel.

Vehicle operators are typically paid in units of $/distance traveled, thus they are inclined to drive as fast as possible within environmental constraints, such as speed limits, fleet speed limits, weather-based safety limits, vehicle dynamics, etc. But operators are often responsible for purchasing their own fuel, so inefficiencies inherent in driving at maximum allowable speed translate into hidden costs that diminish overall operating income. Accordingly, the present disclosure assists vehicle operators by determining the optimal vehicle speed at which an operator can travel such that overall operational cost is minimized. Exemplary embodiments of the systems and methods of the present disclosure are directed to determining appropriate vehicle speed targets to maximize the fuel economy potential over a given route while also considering imposed constraints such as route traverse time targets, maximum governed speed limits, etc. Given certain vehicle operating conditions and terrain element data, the present disclosure manages the engine map to provide a recommended vehicle speed that optimizes fuel consumption. One benefit of optimizing fuel management is increased freight efficiency in transporting cargo from source to destination.

To assist in the determination of appropriate operating condition references, applicants introduce a Cycle Efficiency Management (CEM) module that employs control processes to furnish an operator with anticipated and currently desired vehicle operational behavior to optimize fuel economy. The CEM control processes focus on powertrain components such as engine, transmission, accessories, final drive, wheels and vehicle. The processes interface with the operator to provide guidance as to appropriate vehicle speed/power targets and transmission gear selection targets. The CEM module is useful in conditioning an operator to optimize behavior based on certain performance criteria.

Figure 2:
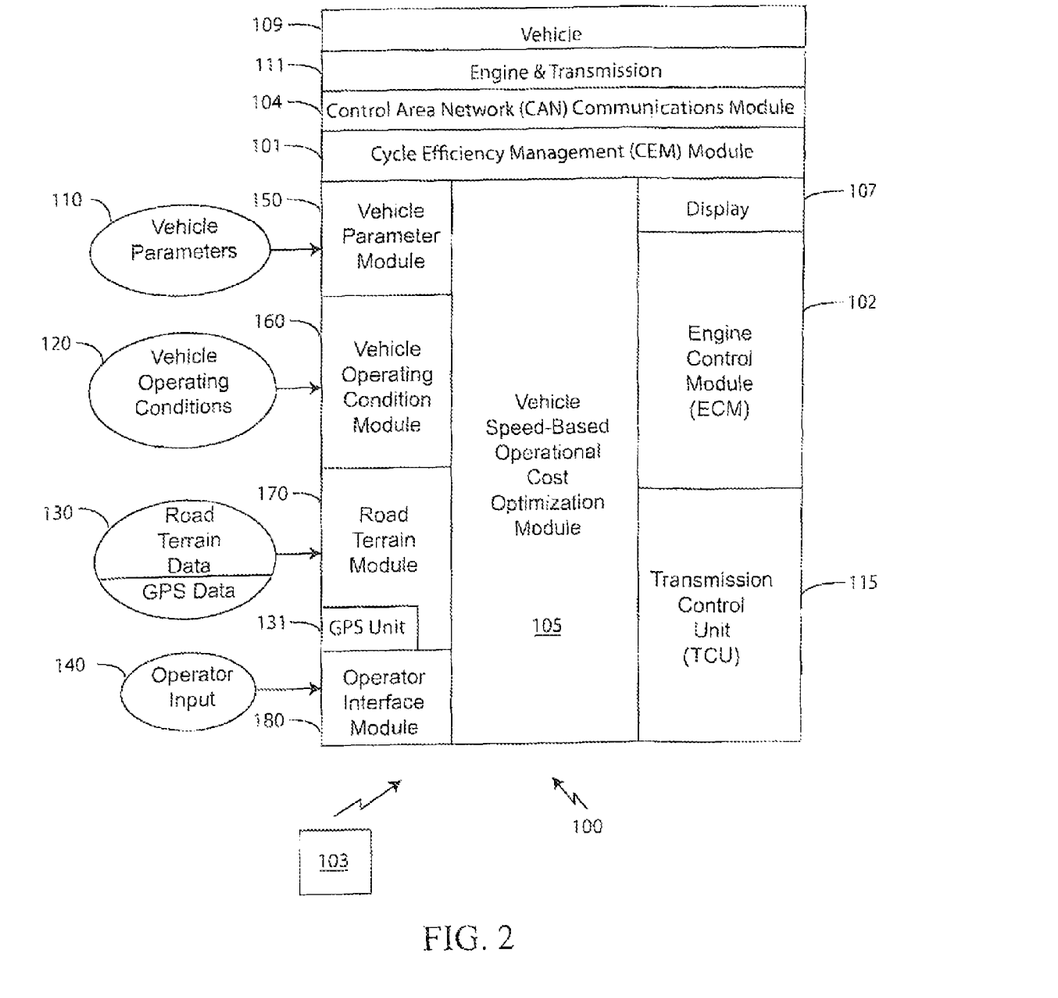
FIG. 2 is a system diagram for a vehicle speed-based operational cost optimization system in accordance with an exemplary embodiment of the present disclosure.

FIG. 2 is a system diagram for a vehicle speed-based operational cost optimization system 100 in accordance with an exemplary embodiment of the systems and methods of the present disclosure. System 100 is integrated into a vehicle 109, such as a truck or automobile, having an engine and transmission 111 including a plurality of gears into which the transmission can be shifted automatically by a transmission control unit 115 or manually by a driver of the vehicle. Generally, predetermined vehicle parameters 110, current vehicle operating conditions 120, terrain profile data/information 130, and operator input 140 are input into a CEM module 101 via control area network (CAN) communications module 104, then used by a vehicle speed-based operational cost optimization module 105 to determine a recommended vehicle speed. In addition to other components, CEM module 101 contains vehicle speed-based operational cost optimization module 105, and may also include a central processor and database. Communication equipment/modules 104 can be provided to enable input data, such as road terrain data, to be transmitted to the central processor for monitoring and control. CEM module 101 may include a vehicle parameter module 150 adapted to receive vehicle parameters 110, a vehicle operating condition module 160 adapted to receive current vehicle operating conditions 120, a road terrain module 170 adapted to receive road terrain data 130, and an operator interface module 180 to receive operator input 140. Exemplary embodiments provide for at least a portion of the road terrain data to be provided as GPS data to a GPS unit 131, which can supply data in advance of an operation or forthcoming positions or in real-time as the vehicle is operated and route traversed. Alternate embodiments provide for road terrain data to be maintained in computer storage 103 and downloaded to the CEM module prior to the start of a trip or transmitted wirelessly over-the-air at any time, for example, by using cellular technology. The CEM module 101 enables operator input 140 in order to provide a degree of control for vehicle operators and thus improve driveability. In operation, the operator programs one or more preferences for how they desire the vehicle to behave during the course of the route. Using this control mode, the operator can, amongst other things, specify such preferences as travel time 222 desired to traverse the route, distance to use in acquiring current vehicle operating conditions (distance interval), and upper speed limit 223. Exemplary embodiments provide for managing the vehicle operating condition to optimize fuel consumption given the travel time constraint 222. Exemplary embodiments provide for the operator to specify preferences via display 107 that is adapted to, amongst other things, indicate the optimized vehicle speed to a vehicle operator. Exemplary embodiments provide for an engine control module (ECM) 102 to be separate from the CEM module 101; alternate embodiments provide for the CEM module 101 and the ECM 102 to form an integrated unit. Likewise, one or more of modules 150, 160, 170, and 180 may be separate from CEM module 101.

Figure 3:
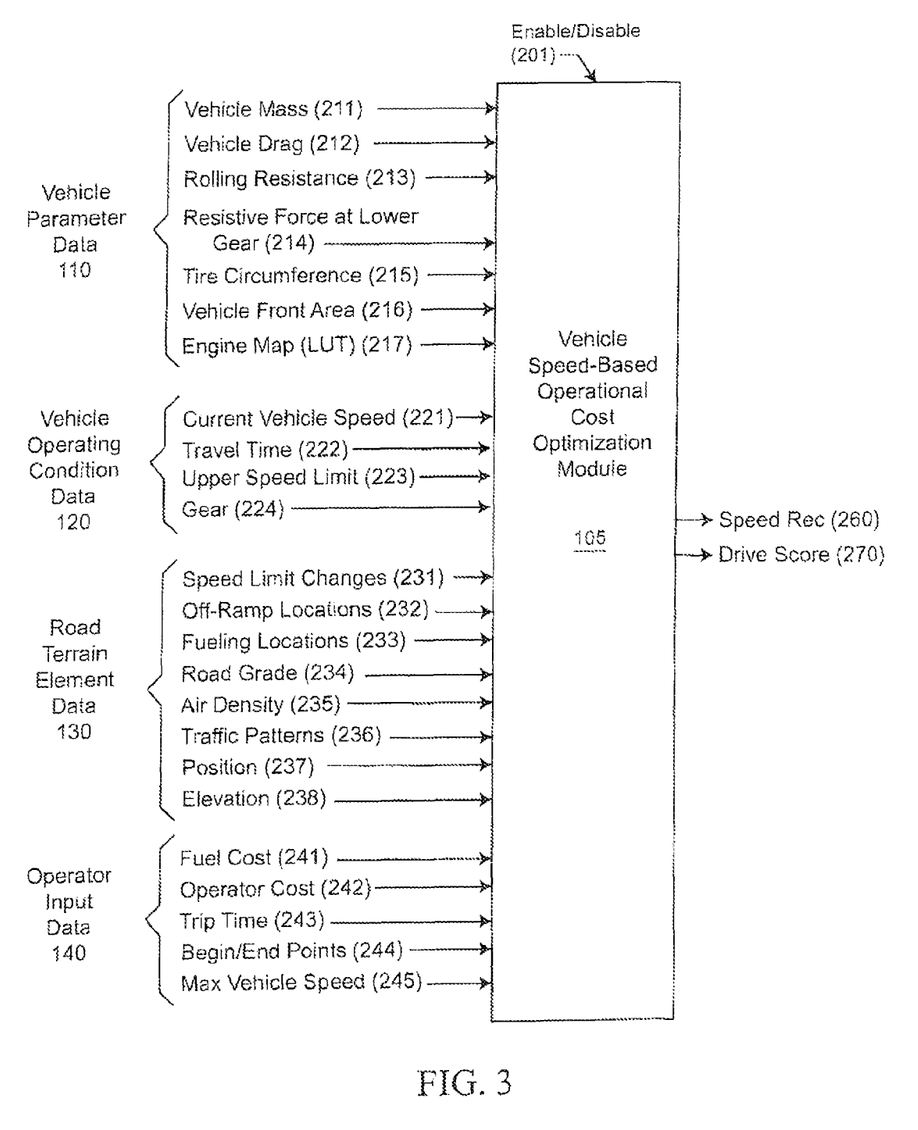
FIG. 3 is an input/output flow diagram for a vehicle speed-based operational cost optimization module in accordance with an exemplary embodiment.

FIG. 3 is an input/output flow diagram for a vehicle speed-based operational cost optimization module 105 in accordance with an exemplary embodiment of the systems and methods of the present disclosure. FIG. 3 illustrates system inputs to vehicle speed-based operational cost optimization module 105, which processes the inputs to determine a vehicle speed recommendation 260 for optimized cost. System inputs are received by CEM module 101, which then enables vehicle speed-based operational cost optimization module 105 via an enable/disable signal 201. The enable/disable signal 201 provides for disabling the vehicle speed-based operational cost optimization system in response to an operator-initiated event. Data indicative of at least one vehicle parameter 110 is received as an input to vehicle speed-based operational cost optimization module 105 via CEM module 101, for example, input to the vehicle parameter module 150. The vehicle parameter data 110 includes data signifying or representing, for example, vehicle mass 211, vehicle drag 212, vehicle rolling resistance 213, drive train resistive force at lower gear 214, tire circumference 215, vehicle front area 216, engine friction 217, driveline ratio, and/or axle loading, which in exemplary embodiments provide three values corresponding to loading on the steer tire, drive tire and trailer tires. The driveline ratio comprises a secondary gearing used in mechanically coupling the transmission to the wheels and is available in certain but not all vehicles. When a driveline ratio is available then the ratio is considered by the vehicle speed-based operational cost optimization module 105 in determining speed recommendations. Vehicle parameter data may include actual values of each of these parameters, such as a vehicle mass value, a drag value, and/or a rolling resistance value. Exemplary embodiments provide for engine fuel data to be supplied by an engine fuel map look-up table (LUT) 217 containing engine fuel data obtained, for example, from engine performance measurements under various speed/torque and grade combinations versus fuel consumed. The Engine fuel map LUT is calibrated offline and embodies the relationship between engine torque, engine speed, grade and engine fueling. Knowing the vehicle's power train system, such as the driveline ratio, gear ratio, driveline system losses, etc., engine speed and torque can be converted to vehicle speed and transmission gear at a certain grade. Thus, an engine fuel map LUT can be obtained from an engine friction map LUT. Alternatively, a vehicle speed and grade based map can be obtained by driving the given vehicle at fixed speeds on constant grades, such as provided either in a controlled facility like a chassis dyno test cell, or by simulating the grade on a flat grade road using a programmable tow-dyno trailer. Separate engine fuel data is available for conditions when engine braking is enabled or when engine braking is disabled. Data indicative of at least one current vehicle operating condition 120 is also received as an input to the vehicle speed-based operational cost optimization module 105 via CEM module 101, for example, input to the vehicle operating condition module 160. The operating condition data 120 includes data signifying or representing current vehicle speed 221, travel or trip time 222, upper speed limit 223, and gear 224. The upper speed limit (Vmax) is a limit some vehicle owners place on their vehicle's and may be less than the maximum speed legally allowable for a particular route. Exemplary embodiments assume that vehicle operators drive at or near the upper speed limit. Exemplary embodiments provide for vehicle operating condition data to be acquired via a vehicle monitoring and positional system, such as a GPS unit 131, and/or provided by the operator. Exemplary embodiments provide for operating condition and route terrain data to be dynamically acquired in real-time, or through "foresight" or look-ahead windows of a discrete distance, such as, for example, 2 miles. In acquiring operating condition and route terrain data in discrete segments as the vehicle moves through a unit distance interval, informational data is acquired and the system updated to, amongst other things, correct for deviations from planned trip traversal, such as route deviations, changes in vehicle speed, changes in traffic patterns, etc. The window can be set at a predetermined default interval and/or can be adjustable by the operator. Window size is selected based upon desired data resolution and speed of processing. Data indicative of at least one road terrain element 130 is also received as an input to the vehicle speed-based operational cost optimization module 105 via CEM module 101, for example, to the road terrain module 170. The road terrain element data 130 includes data signifying or representing speed limit changes 231, off-ramp locations 232, fueling locations 233, road grade 234, air density 235, traffic patterns or congestion 236, position 237 and elevation 238. Exemplary embodiments provide for speed limit and road terrain data to be furnished by an Advanced Driver Assistance System (ADAS), such as that furnished by data vendors, such as, for example, E-Horizon™ and NAVTEQ Traffic™ systems; positional-based systems, such as a GPS, can provide data on vehicle position 237. Road terrain element data 130, such as route grade 234, elevation 238, speed limit changes 231 and fueling station locations 233 can be obtained ahead of time to provide a snapshot of the entire route. Data indicative of at least one operator input 140 is also received as an input to the vehicle speed-based operational cost optimization module 105 via CEM module 101, for example, to the operator input module 180. The operator input data 140 includes data signifying or representing fuel cost 241, operator cost 242 (operator income per mile), trip time 243, route beginning and ending points 244, and maximum vehicle speed 245, which is a speed the operator is not to exceed and may be less than the legal speed limit. Exemplary embodiments call for maximum vehicle speed 245 to be the same as upper speed limit 223. Outputs from vehicle speed-based operational cost optimization module 105 include a determination of a recommended speed 260 and driver or operator score 270.

Figure 4:
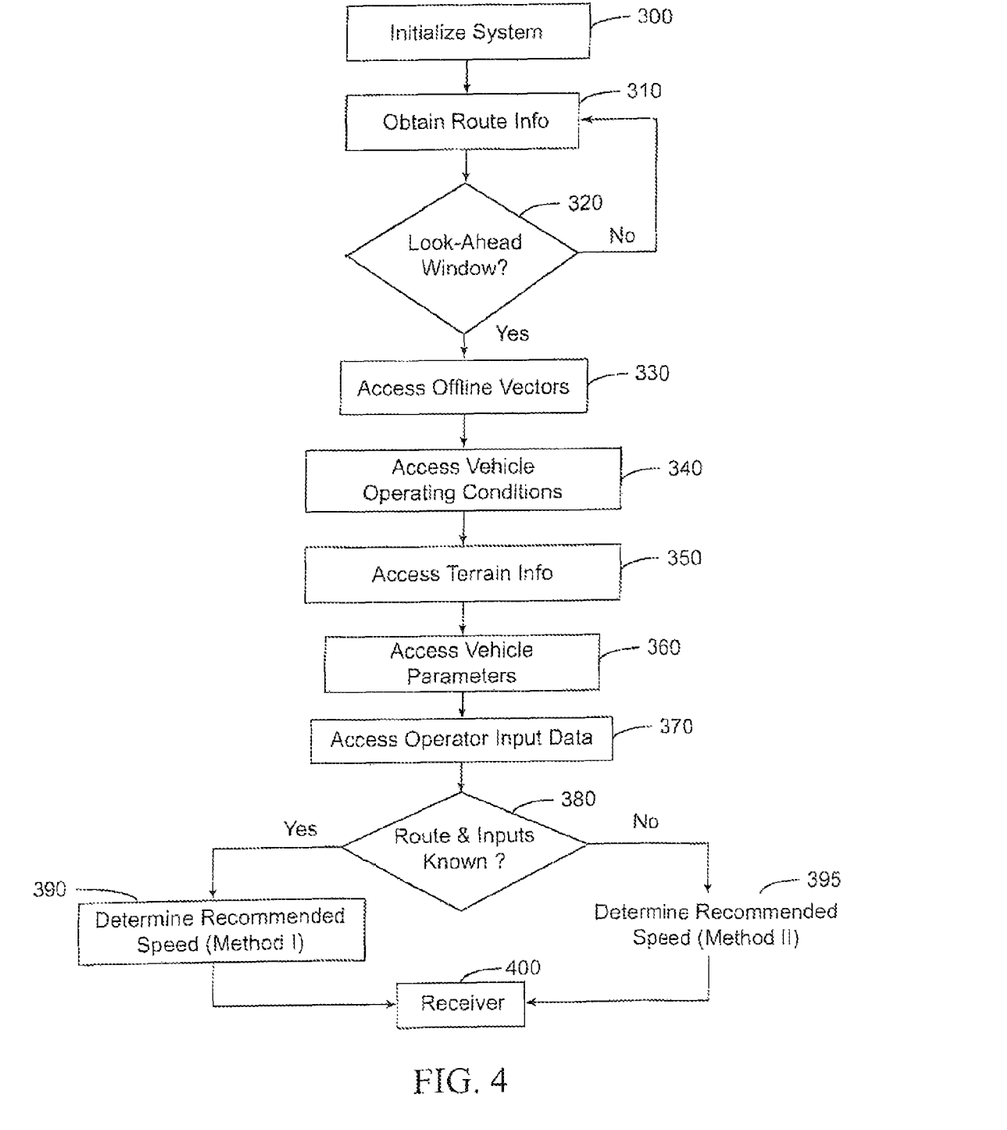
FIG. 4 is a flow diagram depicting method steps for vehicle speed-based operational cost optimization in accordance with an exemplary embodiment.

FIG. 4 is a flow diagram depicting the steps of a method for vehicle speed-based operational cost optimization in accordance with an exemplary embodiment. The method includes two steps: first, an offline, i.e., first, coarse evaluation and optimization is performed over the full drive cycle/route; then second, during drive cycle execution, fine-tuned refinements are periodically achieved using a moving look-ahead window during an online, i.e., second, optimization. Prior to deployment, the vehicle's speed-based operational cost optimization 100 is initialized with known route and vehicle data, step 300. The system 100 can be initialized prior to the operator's arrival or initiated by an action of the operator, such as, for example, pressing a button on a user interface to start the optimization. An operator, or an external source such as a central database, supplies the vehicle with a trip destination and planned route and trip time; known road terrain element data 130 are acquired via the operator, a database, or data vendor, as described above. Exemplary embodiments provide for the operator to enter vehicle parameters 110 and preferences for how the vehicle should behave on the route. Alternatively, or in conjunction with operator entry, vehicle parameters can be provided by a database containing vehicle information. Further, road terrain element data 130, such as route grade 234, speed limit changes 231 and fueling station locations 233 can be obtained ahead of time to provide an offline snapshot of the entire route. The data is then processed in a first, offline optimization to provide an estimate of fuel economy, along with a vehicle speed optimization vector comprising route velocities that have been optimized for fuel economy. Generally, the offline optimization of the systems and methods of the present disclosure is performed prior to or at the beginning of a trip. Alternatively, or in addition to, offline optimization can occur at any point along the route after the vehicle is underway. Such a capability is convenient if it is desirable to undertake a delayed optimization or system recalibration or restart/re-initiation. Exemplary embodiments employ a weighting function in determining optimal speed to account for vehicle momentum during downhill and uphill sections of the route. Inputs vehicle speed-based operational cost optimization system 100 are received by an input signal processing module (not shown), which processes the data to a form useable by vehicle speed-based operational cost optimization module 105. For example, the input signal possessing module can translate data to different units, filter noise, truncate vectors, etc.

The offline optimization employs a representation of the vehicle, which in exemplary embodiments uses standard vehicle modeling known to those of ordinary skill in the art. One implementation employs a model wherein fuel consumption over a given route is described through differential-algebraic relationships that are a function of, amongst other things, vehicle velocity, i.e., speed, and acceleration, gear, route grade, vehicle powertrain and engine parameters. The model is optimized for lowest cost by minimizing an estimate of fuel consumption over the entire route using trip travel time 222 as an operating constraint. This cost optimized vehicle model (cost function) looks to select a vehicle speed as a function of the route and grade in order to minimize fuel consumption balanced against cost. In addition to fuel cost, cost can include vehicle warranty, maintenance, wear-and-tear, etc. Thus, exemplary embodiments encompass all these cost components and provide the operator with an optimization of speed relative to all of them. Exemplary embodiments minimize fuel consumption relative to vehicle speed and gear state by accessing an engine map.

Power demanded by a vehicle is a function, primarily, of the vehicle operating condition, which, among other things, includes vehicle mass, vehicle speed, rolling resistance and transmission gear, coupled with the instantaneous road conditions (grade, drag, wind speed, air density, etc.). For example, if either the speed or grade drops/decreases by traveling at a lower speed or going downhill, less power will be required for the vehicle to traverse a given distance. Accounting for system inefficiencies, power can be translated into engine torque and the vehicle's system of gears translates vehicle speed to engine speed. Thus, by knowing power demand, vehicle speed, and transmission gear, which when coupled with engine speed and torque, a particular point on the engine map can be identified. A change in engine speed location on the engine map will require a change in engine torque to achieve the same output power. And for a given point on the engine map, a certain amount of fuel will be required. Thus, by changing the engine speed and torque point, the amount of fuel needed to provide the same output power varies. By recognizing or determining the desired location on the engine map, an equivalent vehicle speed choice can be back-calculated. Accordingly, minimization of fuel consumption can be realized by traversing the engine map to find the appropriate engine speed and torque combination to satisfy the power demand and minimize fuel consumption. This minimized fuel consumption is balanced against operator cost. Exemplary embodiments employ mathematical techniques to identify the minimum value of the fuel consumption in traversing the engine map. Such mathematical minimization techniques are known to those of ordinary skill in the art and can include, for example, techniques such as Steepest Descent, Non-linear Programming, Genetic Algorithms, etc.

During travel, pre-planned routes are subject to operator change as road conditions, weather, traffic, and other unexpected situations arise that necessitate route deviation. Such deviations cause error in the offline optimization that was executed during system initialization, step 300 (or elsewhere). Deviations that impact vehicle speed, such as traffic patterns, are limiting conditions that are operationally akin to a speed limit constraint. To account for off-nominal deviations and other conditions that occur in real-time, the vehicle speed-based operational cost optimization module 105 employs an online, fine optimization process, an exemplary embodiment of which is as follows. As the vehicle is underway, route information is obtained, step 310, via a vehicle monitoring and positional system, such as a GPS unit 131, and/or provided by the operator. Such route information confirms data obtained previously according to the planned route during offline optimization (step 300) and provides a basis for correction during unplanned route deviations as the route is driven. Exemplary embodiments provide for speed limit and road terrain data to be furnished by data vendors, such as, for example, E-Horizon™ and NAVTEQ Traffic™ systems, as described above.

As the route is traversed, the vehicle operating condition management system 100 checks for the occurrence of a look-ahead window, step 320, which is defined by a discrete distance. At each occurrence of a look-ahead window the online optimization is performed. As discussed above, exemplary embodiments provide for operating condition and route terrain data to be dynamically acquired in real-time through "foresight" or look-ahead windows of a discrete distance, such as, for example, 2 miles. In acquiring operating condition and route terrain data in discrete segments as the vehicle moves through a unit distance, informational data is acquired and the system updated to, amongst other things, correct for deviations from the offline optimization. The size or distance of the look-ahead window can be set at a default interval or adjustable by the operator. Window size is selected based upon the desired data resolution and speed of processing. Exemplary embodiments provide for offline optimization to run at a coarse distance resolution, for example, 0.5 miles, whereas the online optimization runs at a fine resolution, for example, 0.1 miles, within its defined look-ahead window.

The online optimization process receives data from the offline optimization process to satisfy the objective of minimizing fuel consumption under the trip time constraint, step 330. Exemplary embodiments provide for determining a new vehicle speed optimization vector that comprises velocity profiles as a function of distance for the entire route and is based on an offline vehicle speed optimization vector determined during the offline optimization. Both new and offline vehicle speed optimization vectors are determined in view of the engine map to minimize fuel consumption. For example, the velocity vector from the offline, coarse route is used to calculate the time required to travel the distance of a given "look-ahead" window during online optimization. Thus, each time the online optimization is performed it calculates a new velocity vector derived from the offline pre-planned route, thus ensuring that the trip time for the whole route will be satisfied. The online optimization is refreshed each time the defined "look-ahead" window distance is traversed. The online optimization process employs a representation of the vehicle that follows that of the offline optimization process and minimizes the fuel consumption in a similar way, that is, by traversing the engine map. And as indicated above, the online optimization process receives its data at a fine resolution over a discrete section of the route, that is, during the "look-ahead" window, within which the positional and road terrain information devices provide a stream of data that has been obtained in real-time. Outputs from the online optimization are recommended reference speed and transmission gear.

During an online optimization "look-ahead" window, data indicative of the current vehicle operating condition is accessed, step 340. Current vehicle operating conditions include, in addition travel time, the current vehicle speed, the lower speed target, the upper speed limit and current transmission gear. Exemplary embodiments provide for current vehicle speed to be obtained from instrumentation on the vehicle, such as, for example, a speedometer and/or a positional indicator, such as a GPS unit 131, which provides a measure of change relative to position over time. Data indicative of road terrain elements is accessed, step 350. Road terrain elements include, but are not limited to, route grade, speed limit changes, off-ramp locations, fueling station locations, air density, traffic patterns, position and elevation. Data indicative of predetermined vehicle parameters is also accessed, step 360. Predetermined vehicle parameters include, but are not limited to, vehicle mass, vehicle drag, vehicle rolling resistance, resistive force at lower gear, tire circumference, vehicle front area, and engine map. Data indicative of operator input is also access, step 370. Operator input data includes, but is not limited to, fuel cost, operator income or expense, trip travel time, route beginning and ending points, and maximum vehicle speed. Data indicative of road terrain elements, predetermined vehicle parameters, and operator input are obtained primarily during system initialization, step 300, but can be updated or changed at any time by the operator or via network communication, such as wireless over-the-air transmissions, and during online optimization. Data is continually furnished by system 100 components and accessed as needed, as described above.

When characteristics of the route and inputs are known, the operating cost function (operating income) P can be solved using a table-based look-up approach (Method I). In this approach, a table is used to determine fuel economy FE as a function of vehicle speed and grade. Fuel economy is then used in a cost function that is maximized. The vehicle fuel economy data is related to maximum speed and power demand. The operating income P is determined based on an aggregate fuel cost data and an aggregate operator income data. The aggregate fuel cost is based on factors including route distance, time for travel, and fuel cost per unit volume and the aggregate operator income being based on factors including route distance, time for travel, and operator income per unit distance. The operating income P is maximized relative to vehicle speed to determine the recommended vehicle speed. The operating income per hour (total income) P may be expressed as operator income less fuel cost and, expanding into subcomponents, may comprise a function of fuel cost per gallon N, route distance D, trip time T, fuel economy FE, and operator income per mile C, and can be expressed according to Equation I.

$$P = \frac{D}{T}C - \frac{D}{T}\frac{N}{FE} \qquad \text{Equation I}$$

Taking a partial derivative of cost with respect to vehicle speed $V_{max\ speed}$ yields, $$\frac{\partial P}{\partial V_{maxspeed}} = \frac{\partial\left(\frac{D}{T}C\right)}{\partial V_{maxspeed}} - \frac{\partial\left(\frac{D}{T}*\frac{N}{FE}\right)}{\partial V_{maxspeed}}$$

$$= DC\frac{\partial\left(\frac{1}{T}C\right)}{\partial V_{maxspeed}} - DN\frac{\partial\left(\frac{1}{T*FE}\right)}{\partial V_{maxspeed}},$$

which simplifies to $$\frac{\partial P}{\partial V_{maxspeed}} = -\frac{DC}{T^2}\frac{\partial T}{\partial V_{maxspeed}} + \frac{DN}{(T*FE)^2}\frac{\partial(T*FE)}{\partial V_{maxspeed}}$$

$$= -\frac{DC}{T^2}\frac{\partial T}{\partial V_{maxspeed}} + \frac{DN}{(T*FE)^2}$$

$$\left\{FE\frac{\partial T}{\partial V_{maxspeed}} + T\frac{\partial FE}{\partial V_{maxspeed}}\right\},$$

setting $\frac{\partial P}{\partial V_{maxspeed}} = 0$ to maximize the operating income and minimize cost relative to speed.

Because trip time and fuel economy are dependent on vehicle drive cycle and powertrain component efficiencies, a closed form solution of the above cost function may not be available and therefore this equation may be solved using numerical methods known to those of ordinary skill in the art.

When characteristics of the route and inputs are not known, the operating cost function (operating income) P can be solved using a modeling approach (Method II). An engineering approximation is made whereby fuel economy is proportional to aerodynamic loading. Generally, losses come from four parts: aerodynamic losses, rolling resistance to the tires, gravitational forces due to inclination or grade, and acceleration (since power is expended when the vehicle accelerates or decelerates). The largest of these forces is aerodynamic loading, which is a function of the square of vehicle speed. The faster the vehicle travels, the more dominant this loss is relative to the others. Thus, this approximation is most accurate at line-haul or highway conditions. To facilitate this modeling approach, exemplary embodiments provide for fuel economy to be measured under test conditions, which is then used to provide a proportional measure of fuel economy during online driving conditions. Under this model, the cost function (operating income) P, which comprises a function of fuel cost N, route distance D, trip time T, fuel economy FE, operator income per mile C, and vehicle speed $V_{max\ speed}$ is modeled by Equation I, with the same partial differential equation, and with an approximation as to aerodynamic loading incorporated into the fuel economy function. Under this approximation, fuel economy FE can be modeled on the ratio of vehicle performance under test to vehicle performance while on route and can be expressed as a function of air density $\rho$, vehicle drag $C_d$, vehicle front area A, and a function of vehicle speed $v_{Max\ Speed}$, which yields Equation II, $$FE \approx \frac{\left\{\dfrac{C_d \rho A v_{Test\ Speed}^2}{2}\right\}}{\left\{\dfrac{C_d \rho A v_{Max\ Speed}^2}{2}\right\}} FE_{Test\ Speed} = \frac{v_{Test\ Speed}^2}{v_{Max\ Speed}^2} FE_{Test\ Speed} \quad \text{Equation II}$$

Exemplary embodiments provide for the operator to elect which method to use in determining the cost function (operating income) P (Method I or Method II). Alternatively, the system 100 can make an assessment as to the quality of data received, such as, for example, when a satellite is off-line, thereby causing the positional data to be suspect. In the event of poor data quality, the system would elect Method II.

Outputs of the vehicle speed-based operational cost optimization module 105 include a determination of the vehicle operating condition, namely, a recommended speed 260 and driver or operator score 270. The driver score 270 is a performance indicator that provides a measure of how well the vehicle operator maintains the vehicle at the recommended speed. It can also provide the driver with an indication of variances in cost relative to the optimized speed. In this manner a vehicle operator can have knowledge of the actual cost of driving performance.

The determined optimized vehicle speed can then be communicated to a receiver 400, such as an engine control module (ECM) 102 and/or display 107. Exemplary embodiments provide for generating an electronic recommendation signal corresponding to the recommended vehicle optimized speed. Certain embodiments provide for the recommendation signal to be communicated to an engine control unit (ECU) 102 for automatic speed control of the vehicle; other embodiments provide for the recommendation signal to be communicated to the operator via display 107 to facilitate manual action by the operator. Display 107 can be a touch-screen interface for convenient data entry and is adapted to, amongst other things, indicate optimized vehicle operating conditions and performance to a vehicle operator. Exemplary embodiments provide for recommendations to be made to the operator concerning throttle and brake control; that is, the display can convey instructions such as "press throttle recommended" or "lift off throttle recommended" or "press brake recommended" or "lift off brake recommended" or "coast recommended."

Exemplary embodiments provide a system adapted for vehicle speed-based operational cost optimization for a vehicle. The system includes a vehicle parameter module containing data indicative of at least one predetermined vehicle parameter, the at least one predetermined vehicle parameter including at least one of vehicle mass, vehicle drag, vehicle rolling resistance, resistive force at lower gear, tire circumference, front area of vehicle, and engine friction. The system further includes a road terrain element module containing data indicative of at least one road terrain element, the at least one road terrain element including at least one of speed limit changes, off ramp locations, fueling locations, road grade, air density and traffic congestion. The system also includes an operator input module containing data indicative of at least one operator input, said at least one operator input including at least one of fuel cost, operator cost, trip time, route beginning and ending points to define a route, and maximum vehicle speed. The system additionally includes a vehicle operating condition module containing data indicative of at least two current vehicle operating conditions, said at least two current vehicle operating conditions including current vehicle speed and road grade. And the system includes a vehicle speed-based operational cost optimization module adapted to perform an offline optimization wherein a vehicle speed optimization vector is determined based on said accessed predetermined vehicle parameter data, road terrain data, and said operator input data, and perform an online optimization to determine an optimized vehicle speed based on said current vehicle operating data and said vehicle speed optimization vector to optimize operational cost.

Exemplary embodiments provide a system and method for vehicle speed-based operational cost optimization to be implemented in computer programmable software and stored in computer readable media. Such an embodiment would comprise a computer readable storage medium encoded with computer executable instructions, which, when executed by a processor, perform the method for vehicle operating condition management as disclosed above. Also, many aspects of the disclosure are described in terms of sequences of actions to be performed by elements of a computer system or other hardware capable of executing programmed instructions. It will be recognized that in each of the embodiments, the various actions could be performed by specialized circuits (e.g., discrete logic gates interconnected to perform a specialized function), by program instructions (software), such as program modules, being executed by one or more processors, or by a combination of both. Moreover, the disclosure can additionally be considered to be embodied within any form of computer readable carrier, such as solid-state memory, magnetic disk, and optical disk containing an appropriate set of computer instructions, such as program modules, and data structures that would cause a processor to carry out the techniques described herein. A computer-readable medium would include the following: an electrical connection having one or more wires, magnetic disk storage, magnetic cassettes, magnetic tape or other magnetic storage devices, a portable computer diskette, a random access memory (RAM), a read-only memory (ROM), an erasable programmable read-only memory (EPROM or Flash memory), or any other medium capable of storing information. It should be noted that the system of the present disclosure is illustrated and discussed herein as having various modules and units which perform particular functions. It should be understood that these modules and units are merely schematically illustrated based on their function for clarity purposes, and do not necessarily represent specific hardware or software. In this regard, these modules, units and other components may be hardware and/or software implemented to substantially perform their particular functions explained herein. The various functions of the different components can be combined or segregated as hardware and/or software modules in any manner, and can be useful separately or in combination. Thus, the various aspects of the disclosure may be embodied in many different forms, and all such forms are contemplated to be within the scope of the disclosure.

While various embodiments in accordance with the present disclosure have been shown and described, it is understood that the disclosure is not limited thereto. Further, the present disclosure may be changed, modified and further applied by those skilled in the art. Therefore, this disclosure is not limited to the detail shown and described previously, but also includes all such changes and modifications.

We claim:

1. A method for vehicle speed-based operational cost optimization for a vehicle, comprising:
   providing one or more processors and a vehicle speed-based operational cost optimization module,
   the one or more processors:

accessing predetermined vehicle parameter data indicative of at least one predetermined vehicle parameter, said at least one predetermined vehicle parameter including at least one of vehicle mass, vehicle drag, vehicle rolling resistance, tire circumference, front area of vehicle, and engine friction;

accessing road terrain data indicative of at least one road terrain element, said at least one road terrain element including at least one of speed limit changes, off ramp locations, fueling locations, road grade, air density and traffic congestion;

accessing operator input data indicative of operator input, said operator input including at least fuel cost and operator income;

performing a first optimization by the vehicle speed-based operational cost optimization module to determine a vehicle speed optimization vector based on said accessed predetermined vehicle parameter data, road terrain data, and said operator input data;

accessing current vehicle operating data indicative of at least two current vehicle operating conditions, said at least two current vehicle operating conditions including current vehicle speed and road grade;

determining operating income based on a function of at least the fuel cost and the operator income; and performing a second optimization by the vehicle speed-based operational cost optimization module to determine an optimized vehicle speed based on said current vehicle operating data and said vehicle speed optimization vector by maximizing the operating income relative to a vehicle speed.

2. The method of claim 1, further comprising generating an electronic recommendation signal corresponding to said determined optimized vehicle speed and communicating said determined optimized vehicle speed to a receiver.

3. The method of claim 2, wherein said receiver comprises an engine control module.

4. The method of claim 2, wherein said receiver comprises a display adapted to indicate the optimized vehicle speed to a vehicle operator and provide a measure of performance relative to said optimized vehicle speed.

5. The method of claim 4, wherein said display comprises a touch-screen interface.

6. The method of claim 1, wherein said vehicle speed optimization vector comprises a profile of speed values that yield optimal fuel economy over discrete sections of the route, said sections being defined by speed limit and grade variations, wherein the speed values provide optimal fuel economy relative to the operating income.

7. The method of claim 1, wherein said performing the first optimization comprises solving for a vehicle speed optimization vector over an engine map to minimize fuel consumption relative to the operating income.

8. The method of claim 7, wherein said operating income comprises a function of fuel cost, route distance, trip time, fuel economy, and operator income.

9. The method of claim 8, wherein said operating income is determined according to the equation $$P = \frac{D}{T}C - \frac{D}{T}\frac{N}{FE}.$$

wherein P indicates the operational cost, D indicates the route distance, T indicates the trip time, C indicates the operator income, N indicates the fuel cost, and FE indicates the fuel economy.

10. The method of claim 7, wherein said performing the second optimization comprises accessing the first vehicle speed optimization vector and determining new vehicle speed optimization vector over said engine map to minimize fuel consumption relative to the operating income.

11. The method of claim 10, wherein said operating income is based on a fuel economy look-up table when said route and data inputs are known.

12. The method of claim 10, wherein said operating income is based on a function of aerodynamic loading when said route and data inputs are unknown.

13. The method of claim 1, wherein said current vehicle operating condition data is acquired in real-time through a foresight window of a discrete distance interval.

14. A system adapted for vehicle speed-based operational cost optimization for a vehicle, comprising:

a vehicle parameter module containing data indicative of at least one predetermined vehicle parameter, said at least one predetermined vehicle parameter including at least one of vehicle mass, vehicle drag, vehicle rolling resistance, tire circumference, front area of vehicle, and engine friction;

a road terrain element module containing data indicative of at least one road terrain element, said at least one road terrain element including at least one of speed limit changes, off ramp locations, fueling locations, road grade, air density and traffic congestion;

an operator input module containing data indicative of operator input, said operator input including at least fuel cost operator income;

a vehicle operating condition module containing data indicative of at least two current vehicle operating conditions, said at least two current vehicle operating conditions including current vehicle speed and road grade; and a vehicle speed-based operational cost optimization module adapted to:

perform a first optimization wherein a vehicle speed optimization vector is determined based on said accessed predetermined vehicle parameter data, road terrain data, and said operator input data;

determine operating income based on a function of at least the fuel cost and the operator income; and perform a second optimization to determine an optimized vehicle speed based on said current vehicle operating data and said vehicle speed optimization vector by maximizing the operating income relative to a vehicle speed.

15. The system of claim 14, wherein said vehicle speed-based operational cost optimization module is adapted to generate an electronic recommendation signal corresponding to said determined optimized vehicle speed and communicating said determined optimized vehicle speed to a receiver.

16. The system of claim 15, wherein said receiver comprises an engine control module.

17. The system of claim 16, wherein said receiver comprises a display adapted to indicate the optimized vehicle speed to a vehicle operator and provide a measure of performance relative to said optimized vehicle speed.

18. The system of claim 14, wherein said vehicle speed optimization vector comprises a profile of speed values that yield optimal fuel economy over discrete sections of the route, said sections being defined by speed limit and grade variations, wherein the speed values provide optimal fuel economy relative to the operating income.

19. The system of claim 15, wherein said performing the first optimization comprises solving vehicle speed optimization vector over an engine map to minimize fuel consumption relative to the operating income.

20. The system of claim 19, wherein said operating income comprises a function of fuel cost, route distance, trip time, fuel economy, and operator income.

21. The system of claim 20, wherein said operating income is determined according to the equation $$P = \frac{D}{T}C - \frac{D}{T}\frac{N}{FE}.$$

where P indicates the operational cost, D indicates the route distance, T indicates the trip time, C indicates the operator income, N indicates the fuel cost, and FE indicates the fuel economy.

22. The system of claim 19, wherein said performing the second optimization comprises accessing the first vehicle speed optimization vector and determining a new vehicle speed optimization vector over said engine map to minimize fuel consumption relative to the operating income.

23. The system of claim 15, wherein said current vehicle operating condition data is acquired in real-time through a foresight window of a discrete distance interval.

24. A computer program product comprising a non-transitory computer useable medium having stored thereon computer-readable program code for vehicle speed-based operational cost optimization for a vehicle, the computer-readable program code comprising:
    computer-readable program code for accessing data indicative of at least one predetermined vehicle parameter, said predetermined vehicle parameter including at least one of vehicle mass, vehicle drag, rolling resistance, tire circumference, front area of vehicle, and engine friction;
    computer-readable program code for accessing data indicative of at least one road terrain element, said at least one road terrain element including at least one of speed limit changes, off ramp locations, fueling locations, road grade, air density and traffic congestion;
    computer-readable program code for accessing data indicative of operator input, said one operator input including at least fuel cost and operator income;
    computer-readable code for performing a first optimization to determine a vehicle speed optimization vector based on said accessed predetermined vehicle parameter data, road terrain data, and said operator input data;
    computer-readable program code for accessing data indicative of at least two current vehicle operating conditions, said at least two current vehicle operating conditions including current vehicle speed and road grade;
    computer-readable program code for determining operating income based on a function of at least the fuel cost and the operator income and performing a second optimization to determine an optimized vehicle speed based on said current vehicle operating data and said vehicle speed optimization vector by maximizing the operating income relative to a vehicle speed; and
    computer-readable program code for communicating said optimized vehicle speed and communicating said determined optimized vehicle speed to a receiver.

25. The computer program product of claim 24, further comprising computer-readable program code for disabling the vehicle speed-based operational cost optimization program code in response to an operator-initiated event.

26. The method of claim 1, wherein the fuel cost is fuel cost per unit volume and the operator income is operator income per unit distance; and
    the operating income is determined based on an aggregate fuel cost and an aggregate operator income, the aggregate fuel cost being based on at least route distance, time for travel, and the fuel cost per unit volume, the aggregate operator income being based on at least route distance, time for travel, and the operator income per unit distance.

27. The system of claim 14, wherein the fuel cost is fuel cost per unit volume and the operator income is operator income per unit distance; and
    the operating income is determined based on an aggregate fuel cost and an aggregate operator income, the aggregate fuel cost being based on at least route distance, time for travel, and the fuel cost per unit volume, the aggregate operator income being based on at least route distance, time for travel, and the operator income per unit distance.

28. The computer program product of claim 24, wherein the fuel cost is fuel cost per unit volume and the operator income is operator income per unit distance; and
    the operating income is determined based on an aggregate fuel cost and an aggregate operator income, the aggregate fuel cost being based on at least route distance, time for travel, and the fuel cost per unit volume, the aggregate operator income being based on at least route distance, time for travel, and the operator income per unit distance.

* * * * *